Patented Dec. 30, 1952

2,623,912

UNITED STATES PATENT OFFICE 2,623,912

MANUFACTURE OF POLYCYCLIC AROMATIC COMPOUNDS

Fredrick M. Smith, Bartlesville, Okla., assignor to Phillips Petroleum Company, a corporation of Delaware No Drawing. Application December 19, 1949, Serial No. 133,945

13 Claims. (Cl. 260—668)

This invention relates to the manufacture of phenanthrenes. In one embodiment this invention relates to the inter-reaction of selected aromatic reactant materials with 4-vinyl-1-cyclohexene, to produce octahydrophenanthrenes, by which term I mean to include octahydrobenzanthracenes, octahydrobenzophenanthrenes, and octahydrochrysenes.

Various methods have been proposed by workers in the art for the preparation of octahydrophenanthrenes. Many of the methods used heretofore, involve several process steps, as for example the method described by Bardhan and Sengupta, JACS 1932, pg. 2520, wherein a series of steps is employed involving condensation, hydrolysis, reduction, and finally another condensation before the desired product is obtained. Such a method as that briefly referred to requires expensive process steps, and its application to commercial scale operation would be costly, if at all economically feasible.

My invention is concerned with an improved process for the manufacture of selected octahydrophenanthrenes, from low cost reactant materials, in a single reaction step.

An object of my invention is to provide for the manufacture of selected phenanthrenes. Another object is to convert selected aromatic reactant materials to octahydrophenanthrenes.

Another object is to provide for the inter-reaction of benzene or substituted benzenes with 4-vinyl-1-cyclohexene to produce octahydrophenanthrenes.

Another object is to provide for the inter-reaction of naphthalene or substituted naphthalenes with 4-vinyl-1-cyclohexene to produce octahydrochrysenes, octahydrobenzanthracenes, and octahydrobenzophenanthrenes.

It is still another object to provide for the manufacture of 1,2,3,4,4a,9,10,10a-octahydrophenanthrene and selected derivatives thereof.

Other objects will be apparent to one skilled in the art from the accompanying discussion and disclosure.

In a broad embodiment of my invention, a partially hydrogenated polycyclic organic compound is produced by reacting 4-vinyl-1-cyclohexene with a carbocyclic aromatic compound having on each of two adjacent nuclear carbon atoms a replaceable hydrogen atom and having not more than 2 carbocyclic rings, under catalytic alkylation conditions for alkylating an aromatic hydrocarbon with an aliphatic olefin.

In accordance with a preferred embodiment of my invention, 4-vinyl-1-cyclohexene is reacted with an aromatic reactant compound having the composition illustrated by a structural formula selected from the group consisting of

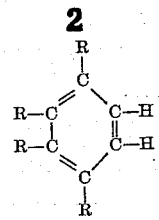

A Benzene and

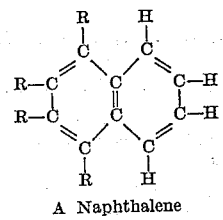

A Naphthalene wherein in each said structural formula, R is a radical selected from the group consisting of hydrogen, methyl, ethyl, i-propyl, n-propyl, i-butyl, tert.-butyl, n-butyl, hydroxy, methoxy, ethoxy, propoxy, butoxy, chlorine, bromine, fluorine and iodine, at least two R's are hydrogen, and the total R's contain not more than 8 carbon atoms; and in the structural formula representing the benzene reactant, one R can be a phenyl radical.

This inter-reaction is conducted under reaction conditions suitable for alkylating an aromatic hydrocarbon, as benzene, with a normally gaseous aliphatic olefin to produce an alkyl derivative, e. g. a monoalkyl benzene.

The products produced by the process herein described are presented by the following formulae,

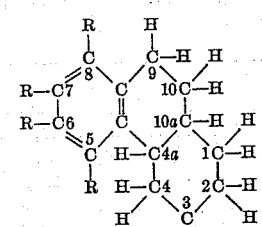

A

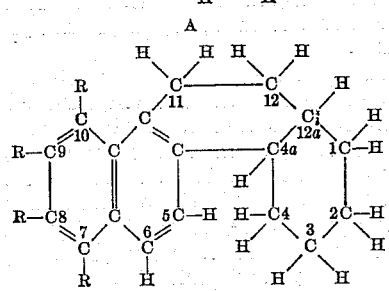

B and the corresponding isomers of structural formula B, wherein in each structural Formula A and B, R is a radical selected from the group consisting of hydrogen, methyl, ethyl, i-propyl, n-propyl, i-butyl, tert.-butyl, n-butyl, hydroxy, methoxy, ethoxy, propoxy, butoxy, chlorine, bromine, fluorine, and iodine, at least two R's are hydrogen, and the total R's contain not more than 8 carbon atoms, the group of radicals also including phenyl as applied to Formula A, Formula A representing product compounds referred to herein as octahydrophenanthrenes, and Formula B and corresponding isomers representing compounds referred to herein as octahydrochrysenes, octahydrobenzanthracenes, and octahydrobenzophenanthrenes; the Formulas A and B being representative of the products formed respectively by the inter-reaction of 4-vinyl-1-cyclohexene with the benzene and naphthalene reactants, above discussed.

Compounds produced by the process of my invention, and having a composition illustrated by the structural Formula A, above, include:

5 - methyl - 1,2,3,4,4$a$,9,10,10$a$-octahydrophenanthrene 6,7 - dimethyl-1,2,3,4,4$a$,9,10,10$a$ - octahydrophenanthrene 7 chloro-1,2,3,4,4$a$,9,10,10$a$ - octahydrophenanthrene 7,8 - diethyl-2,3,4,4$a$,9,10,10$a$ - octahydrophenanthrene 5-ethoxy,7-chloro-1,2,3,4,4$a$,9,10,10$a$ - octahydrophenanthrene 6 - tert.-butyl - 1,2,3,4,4$a$,9,10,10$a$-octahydrophenanthrene, and the like.

Compounds produced by the process of my invention and having a composition illustrated by the structural Formula B, or corresponding isomers thereof, include:

7-methyl,1,2,3,4,4$a$,11,12,12$a$-octahydrochrysene 7,8 -dimethyl,1,2,3,4,4$a$,11,12,12$a$-octahydrochrysene 9-ethoxy,1,2,3,4,4$a$,11,12,12$a$-octahydrochrysene 10-chloro,1,2,3,4,4$a$,11,12,12$a$,octahydrochrysene 7-tert-butyl,1,2,3,4,4$a$,11,12,12$a$ - octahydrochrysene.

7-chloro,8-methyl,1,2,3,4,4$a$,11,12,12$a$ - octahydrochrysene 7-methyl-1,1$a$,2,3,4,4$a$,5,6 - octahydrobenzanthracene 7,8-dimethyl - 1,1$a$,2,3,4,4$a$,5,6 - octahydrobenzophenanthrene.

Various benzenes and naphthalenes, representative of those employed as aromatic reactant materials in the practice of my invention include such compounds as benzene, ortho, meta and para zylene, chlorobenzene, ethoxybenzene, tert.-butylbenzene, 1,ethyl-3-chlorobenzene, 1-methyl-2-chlorobenzene, naphthalene, 1-methylnaphthalene, 1,2-dimethylnaphthalene, 2-ethoxynaphthalene, 1-tert.-butylnaphthalene, 1-chloro-2-methylnaphthalene, tetralin, diphenyl, and phenylcyclohexane.

In a broad embodiment, my invention provides for the inter-reaction of 4-vinyl-1-cyclohexene with an aromatic reactant material of the type already described, under reaction conditions of temperature, catalyst, time, reactant mol ratios, and pressure, similar to those conditions suitable for reacting benzene, or naphthalene, with an olefin such as propylene, or a butylene, to produce a corresponding alkyl derivative.

Catalysts that can be employed in the process of my invention are of both the liquid and solid types, and are well known for their activity as alkylation catalysts in aromatic-olefin reactions of the type above discussed. Liquid catalytic materials representative of those that can be used in the practice of my invention include various complexes of boron fluoride with water, phosphoric acid, and hydrofluoric acid; mixtures of boron fluoride with anhydrous hydrogen fluoride; anhydrous hydrogen fluoride; aqueous hydrofluoric acid having an acid concentration of 50 weight per cent or higher; concentrated sulfuric acid; concentrated phosphoric acid; and the like. Solid catalytic materials representative of those that can be utilized in the process herein described include aluminum chloride, zinc chloride, and ferric chloride; and solids of the silica-base type which comprise composites of silica with one or more oxides of metals selected from group IIIB or from group IVA of the periodic system. Silica-base type catalysts can be of synthetic or natural origin, including such natural occuring substances as montmorillonites activated, when desired, such as by acid treatment, and synthetic catalysts as silica-alumina, silica- zirconia, silica-molybdena, and other such typical silica-metal oxide catalysts. Other solid catalytic materials include supported catalysts such as aluminum chloride on bauxite, aluminum chloride on silica-alumina, aluminum chloride on silica, sulfuric acid on bauxite, and the like.

When employing aqueous hydrofluoric acid catalysts, I select those containing at least 70 per cent by weight of HF, and more preferably from 85 to 99 per cent. Boron fluoride-water complex catalysts are generally prepared by saturating water with boron fluoride to produce a resulting complex containing equi-molar proportions of water and boron fluoride. Hydrofluoric acid-water-boron fluoride catalysts generally contain water in a mol ratio to boron fluoride of 1:1 and from 10 to 90 per cent by weight of hydrogen fluoride. Anhydrous hydrogen fluoride-boron fluoride catalysts employed generally contain from 1 to 50 per cent by weight of boron fluoride, or higher, if desired.

Temperatures employed in carrying out the process of my invention, are selected from a broad range of temperatures generally employed when catalytically alkylating an aromatic hydrocarbon with a normally gaseous aliphatic olefin, as discussed above. Temperatures selected from within the broad range of 40 to 550° F. and higher if desired, are applicable in the practice of my invention. The temperature selected is dependent to a large extent on the specific type catalyst employed. For example when employing liquid alkylation type catalysts of the type already described, temperatures of from 40 to 150° F., more preferably 50 to 120° F., are utilized. In some cases a temperature as high as 250° F. may be used dependent upon the specific liquid catalyst, particularly when employing anhydrous hydrofluoric acid. However, when employing a solid alkylation type catalyst of the type above described, higher temperatures are generally utilized, such temperatures being more often within the limits of from 150 to 650° F., more preferably about 200 to 500° F.

Pressures employed in the practice of my invention are typical of those employed when catalytically alkylating an aromatic hydrocarbon with a normally gaseous aliphatic olefin, as discussed above, and are generally selected from a broad range of from atmospheric pressure to as high as 1000 p. s. i. g., or higher, if desired. When operating with a liquid catalyst the minimum pressure is preferably that required for maintaining the system in liquid phase, and the selected operating pressure is generally within the preferred range of 10 to 50 p. s. i. g. Higher pressures, generally from 100 to 1000 p. s. i. g. are employed when employing solid type catalysts, particularly when employing temperatures in the upper part of the broad temperature range discussed above.

As in the case of the catalytic alkylation of aromatic hydrocarbons with aliphatic olefins, the ratio of aromatic reactant to 4-vinyl-1-cyclohexene is very important, in conducting the process of my invention. I have found that when employing either liquid or solid catalysts, the mol ratio of aromatic reactant to 4-vinyl-1-cyclohexene, introduced into the reaction zone, should be within the limits of 2:1 to 15:1, and that a narrower range of such reactant mol ratios of from 5:1 to 10:1 is preferable. The mol ratio of unreacted aromatic compound to unreacted 4-vinyl-1-cyclohexene in the reacting mixture at any given time is usually much higher than this, and is frequently between 100:1 and 500:1, or more. This is obtained by adding the 4-vinyl-1-cyclohexene gradually to a large volume of an intimate mixture of aromatic reactant and catalyst over a prolonged reaction time either continuously or in successive separate increments, or by continuously adding a stream of each reactant to a large, continuously recirculated volume of reactants and reaction products from which a portion is being continuously withdrawn for recovery of products as is well known to one skilled in the alkylation art.

Contact times utilized in conducting the process described herein are typical of those employed in the catalytic alkylation of aromatic hydrocarbons with normally gaseous olefins and are selected from a broad range of from about 10 minutes to as high as 10 hours, dependent to a large extent upon the type catalyst selected, and reaction temperature employed. When utilizing liquid catalysts, contact times are selected from within a range of 30 to 200 minutes, and more generally within a preferred range of 50 to 150 minutes. When operating with solid type catalysts, a broader range of contact time is generally required, a range of from 12 to 600 minutes being representative, with a narrower range of about 20 to 150 minutes being preferable. The inter-reactions of my invention can be carried out either as batch or continuous flow type operations, and when operating continuously, these contact times can conveniently be expressed in terms of space velocities, i. e. the volume of total charge stock per volume of catalyst per hour, which are, for liquid catalyst operation, broadly from 0.3 to 2 and preferably 0.4 to 1.2, and for solid catalyst operation, from 0.1 to 5.0, preferably from 0.4 to 3.

When employing liquid catalysts, the quantity of catalyst employed will usually be in the range of 1 to 50 volume per cent of the total reaction mixture, and more preferably within the limits of 5 to 20 volume per cent.

I have found that the use of a diluent is often advantageous in conducting my process. Materials which can be suitably employed as diluents include normal paraffin hydrocarbons and cycloparaffin hydrocarbons containing from 4 to 10 carbon atoms in the molecule, more preferably from 5 to 7 carbon atoms in the molecule. I have found that the optimum proportion of diluent is generally in the range of from 0.5 to 2.0 volumes per volume of liquid reactants. When employing a normally solid aromatic reactant I consider the volume of that solid to be its volume in the molten state, whether or not the melting point of the aromatic reactant is higher than the selected reaction temperature. Among the various diluents that can be employed are n-heptene, n-hexane, n-pentane, cyclohexane, n-octane, n-decane, or mixtures thereof.

In order to facilitate separation and recovery of desired materials from the reaction mixture, when a diluent is employed, it is often most advantageous that the diluent be selected having a boiling point, or a boiling range, as the case may be, between that of the product and the unreacted aromatic reactants.

I am not certain as to why higher yields of desired product are obtained when employing a diluent. However, I have observed that in the presence of a diluent, the rate of addition of the vinyl group of the 4-vinyl-1-cyclohexene reactant to the aromatic reactant is less than that taking place in the absence of the diluent, and further that the presence or absence of the diluent has no effect whatsoever on the rate of cyclization that occurs in the formation of the desired product. While cyclization proceeds uninhibited in the presence of a diluent, it appears that the tendency for additional vinyl groups to add to the aromatic reactant and the reaction of the cycloalkenylaromatic with additional aromatic molecules, is lessened. Thus less undesirable heavy by-product is formed, and the desired reaction is more extensive than when operating in the absence of a diluent.

Regardless of whether or not a diluent is employed, I retain the mol ratio of aromatic reactant to 4-vinyl-1-cyclohexene introduced into the reaction zone, within the limits already discussed.

As has already been pointed out herein, the process of my invention, although not an alkylation process, is conducted under conditions of catalyst, time, temperature, pressure, mol ratio of reactants introduced into the reaction zone, and the like, similar to well known conditions suitable for catalytically alkylating an aromatic hydrocarbon, as benzene, with an aliphatic olefin. Such well known conditions for conventional aromatic alkylation reactions are taught by many workers in the art. Typical of many such teachings are, (1) U. S. 2,394,905, to Frey, who teaches the alkylation of benzene in the presence of anhydrous hydrofluoric acid as a catalyst; at a temperature within the range of from as low as 50° F. to as high as 500° F., more generally not higher than about 350° F., a contact time of from 1 to 100 minutes; (2) U. S. 2,403,963, to Axe, who teaches the alkylation of an aromatic hydrocarbon, as benzene, in the presence of a boron trifluoride-water complex as a catalyst; at a temperature within the range of from atmospheric to 150° F.; (3) U. S. 2,419,599 to Schulze, who teaches the alkylation of an aromatic hydrocarbon as benzene with olefins, in the presence of a silica-metal oxide gel-type catalyst, e. g. silica-alumina; at temperatures as high as from 400 to 700° F.; (5) U. S. 2,377,243, to Kimberlin, who teaches the alkylation of benzene in the presence of a Friedel-Crafts-type catalyst particularly such as zinc chloride, iron chloride and aluminum chloride; at a temperature within the range of about 125° F. to 250° F.; (6) U. S. 2,399,662 to Burk, who teaches the alkylation of an aromatic hydrocarbon such as benzene, with a normally gaseous olefin in the presence of a catalyst comprising hydrogen fluoride promoted with generally from 1 to 40 weight per cent boron fluoride based on the weight of the aromatic reactant at a temperature of from 0 to 375° F.

As illustrated in the teachings of the above references, reaction conditions that are necessary for the inter-reaction of an aromatic reactant with 4-vinyl-1-cyclohexene in accordance with my invention, are similar to those employed in alkylating benzene with an aliphatic olefin. In conventional aromatic olefin alkylation reactions for the production of a monoalkyl product, the mol ratio of aromatic reactant to olefin, introduced into the reaction zone, is of particular importance in order to produce the desired product in selective high yield, the mol ratio of aromatic hydrocarbon to olefin being generally from about 3:1 to 15:1, as discussed hereinbefore. Similarly in the inter-reaction described herein it is necessary to maintain a mol ratio of aromatic reactant to 4-vinyl-1-cyclohexene within the range described (2:1 to 15:1), in order that a desired "mono-addition" product having a structural formula as A, or B, as illustrated hereinabove, be produced in selective high yield.

Hereinabove, I have described the conditions under which I conduct the inter-reaction of my invention, and also, conditions ordinarily employed in the alkylation of an aromatic hydrocarbon with a normally gaseous aliphatic olefin, and have illustrated by reference to various U. S. patents, the similarity of the reaction conditions of the process of my invention with those alkylation conditions for reacting an aromatic hydrocarbon in the presence of a catalyst with a normally gaseous olefin. Accordingly, I have shown that I conduct the inter-reaction of an aromatic reactant with 4-vinyl-1-cyclohexene to produce an octahydrophenanthrene under alkylation conditions suitable for effecting reaction of an aromatic hydrocarbon with a normal gaseous aliphatic olefin.

Various procedures are taught in the art for the preparation of catalysts employed in the inter-reaction of my invention. For example, Axe above referred to, teaches boron fluoride-water as an aromatics alkylation catalyst and describes a procedure for its preparation; Schulze, above referred to, teaches the use of silica gel catalysts activated with alumina and/or other metal oxides, as aromatic alkylation catalysts, and their preparation; Burk, above referred to, teaches boron fluoride-hydrofluoric acid complexes as aromatic alkylation catalysts and proportions of boron fluoride employed therein. The use of natural occurring clays in either an activated or an unactivated form, and procedures for effecting activation of these materials as for example acid treating, are well known. Among such natural occurring clays that can be employed are included bauxite, attapulgus clay, montmorillonite, and the like.

Of major importance, among these natural occurring materials named, is montmorillonite, commonly classified as a non-swelling bentonite and sometimes referred to as a subbentonite. Raw montmorillonite in nature—before activation—is believed to have the ideal formula $Al_2Si_4O_{10}(OH)_2 \cdot nH_2O$, and an actual formula corresponding to $MgO \cdot Al_2O_3 \cdot SiO_2 \cdot nH_2O$, since in nature the ideal formula is not realized due to substitutions. The natural montmorillonite clay has a crystalline structure. One apparently typical substitution in the formula of the product as formed in nature is partial replacement of aluminum by magnesium. This montmorillonite mutation does not appear to be haphazard, but characteristically every sixth aluminum ion is apparently supplanted by a magnesium ion, and this replacement of a trivalent cation (aluminum) by a divalent cation (magnesium) is believed to give rise to a deficiency in positive charge. The crystal lattice of the ideal montmorillonite unit crystal cell is characterized by a layer configuration, and each layer is believed to consist of four sheets of oxygen, between the outer sheets of which in the tetrahedral position are located the silicon atoms; in the octahedral position are the aluminum atoms, and in the same oxygen sheets which form the boundaries of the octahedrals are the hydroxyl ions. The deficiency in positive charge caused in the neutral product by the replacement of the trivalent cation by the divalent cation causes the lattice to become negatively charged, and in order to neutralize this charge, various types of cations are adsorbed on the crystal protruding into the water of hydration space between the layers of montmorillonite. The cations, being exposed, are subject to mass action effects and are readily replaceable, thus giving rise to the phenomenon of base exchange which is a characteristic of the substituted montmorillonite.

Modification of the raw montmorillonite to provide a catalyst for the present invention can be effected by activation. The most common form of activation is by means of an acid, and in treating a magnesium substituted montmorillonite in the raw form for use as a catalyst by acid activation, impurities are removed with attendant increase in effective catalytic surface, and also exchangeable ions are replaced by hydrogen, i. e. the surface cations originally present in a magnesium substituted montmorillonite lattice are replaced by hydrogen ions as a result of the activation. Thus, the activated material may be termed a magnesium substituted hydrogen montmorillonite. A further effect of the acid treatment in activating the montmorillonite clay, may well be to dissolve a disproportionate amount of alumina, thus increasing the percentage of magnesia. A sample of the activated montmorillonite clay is characterized by the following analysis

| | Per cent by weight |
|---|---|
| Magnesia | 4.9 |
| Alumina | 14.4 |
| Water | 21.9 |
| Silica | Remainder |

Obviously, the particular percentages of magnesia, alumina, silica, and water will vary within reasonable limits, depending on various factors such as the source of the clay, the extent and character of the acid treatment, and other factors.

In the practice of one embodiment of my invention, the 4-vinyl-1-cyclohexene and the aromatic reactants are dissolved in a diluent such as normal heptene in a ratio of diluent to total reactants within the range of 0.5 to 2 volumes of diluent per total volume of reactants, a 1:1 volume ratio often being employed. The resulting reactant-diluent mixture is passed into a reaction chamber containing a liquid catalyst, e. g. a water-boron fluoride complex, in a proportion to comprise from about 5 to 20 volume per cent of the total resulting reaction mixture. The reactor is provided with a stirrer or other suitable agitating means to aid in contacting the reactants and catalyst. Reaction temperature is maintained at a level in the range of 50 to 120° F., a temperature approximating from 70 to 90° F. often being employed. Sufficient pressure is maintained on this system to retain the reaction mixture in liquid phase, from 10 to 20 p. s. i. g., often being sufficient. The mol ratio of aromatic reactants to 4-vinyl-1-cyclohexene introduced into the reaction chamber is in the preferred range of 5:1 to 10:1, often approximating about 8:1. Operating in this manner in the presence of excess aromatic reactant, a maximum yield of the desired octahydrophenanthrene product is obtained. When employing lower mol ratios of aromatic reactant to 4-vinyl-1-cyclohexene, lower yields of desired product are obtained concomitantly with higher yields of less desirable heavier product. It is for these reasons preferred to employ a mol ratio of aromatic reactant to 4-vinyl-1-cyclohexene of at least 2:1 and more often higher than that value. The reaction time is generally maintained dependent upon the specific operating temperature selected and is more often in the preferred range of 50 to 150 minutes. However when employing a reaction temperature approximating 70 to 90° F., the reaction time is more generally in the order of about 80 to 100 minutes. This operation can be carried out either as a batch or as a continuous process.

Operating continuously, total effluent is passed from the reaction zone to a settling zone and allowed to settle, to permit formation of a product layer and a heavier catalyst layer, together with any heavier oil layer containing concomitantly formed higher molecular weight by-products.

Catalyst layer thus separated is recycled from the settling zone in whole or in part as desired to the reaction zone. A portion of the catalyst layer can, if desired, be continuously withdrawn from the catalyst recycle stream, freed of by-product contaminants, and recycled in purified form to the zone of reaction, thereby controlling the activity of the catalyst in the reaction zone. The lighter product layer is passed from the settling zone to a separation zone, generally a fractionation step, wherein unreacted aromatic reactant and hydrocarbon diluent are separated from total product, as a single fraction, or as separate fractions, as desired, and recycled back to the reaction zone. The phenanthrene product is then recovered from the residual light product-layer in any desired state of purity. The heavier oil layer, containing higher molecular weight by-product, and some diluent, is produced in a minor proportion, and utilized as desired.

When operating batchwise, the catalyst phase is separated from the reaction mixture, and removed. Octahydrophenanthrene product is then recovered from the remaining material in any desired state of purity.

In various instances it may be desirable, when employing a diluent, to introduce the diluent in two separate streams, one stream being directed into the catalyst zone and the other in admixture with reactants in such relative proportions that the resulting overall liquid volume ratio of diluent to reactants in the reaction zone is within the 0.5 to 2 range specified above.

In various instances it may be desirable to introduce a part of the aromatic reactant into the reaction zone independently of the 4-vinyl-1-cyclohexene reactant material. However I prefer to introduce the 4-vinyl-1-cyclohexene reactant in admixture with either inert diluent or aromatic reactant, or both.

In another embodiment of my invention the 4-vinyl-1-cyclohexene and aromatic reactant are mixed in the desired proportions and contacted with a solid type catalyst, such as a silica alumina, an acid treated montmorillonite clay or the like. The operation is carried out under sufficient pressure to maintain liquid or mixed phase conditions and will usually be in the range from 100 to 1000 pounds p. s. i. g. The temperature employed is of course dependent upon the specific catalyst selected and when employing silica-alumina as a catalyst, may be within the preferred range of 200 to 400° F., often approximating about 275 to 325° F. Under these conditions a space velocity of from 1 to 3 volumes of total reactants per catalyst volume per hour, is employed. Effluents are passed from the solid catalyst zone to a separation and recovery zone wherein product of any desired purity is separated from diluent and unreacted reactant materials, and recovered. Unreacted aromatic materials and/or diluent are recycled to the reaction zone as desired.

When utilizing a solid type catalyst, batch-type or continuous-flow type operation may be utilized as desired. However, I generally prefer to employ a fixed bed of solid catalyst and to pass the reactants continuously through the fixed bed. When diluent is employed it will generally be advantageous to admix the diluent, the aromatic reactant, and the 4-vinyl-1-cyclohexene with the other, and to introduce the resulting admixture into contact with the catalyst under the temperature, pressure and space velocity conditions already described.

When reacting a normally solid aromatic reactant with 4-vinyl-1-cyclohexene at a temperature above the melting point of that reactant in the absence of a diluent, that reactant can be introduced into the reaction zone in the molten state, and reacted in liquid phase. Obviously, when reacting a normally solid aromatic reactant at a temperature below its melting point, it must be dissolved in a diluent, preferably of the type already described herein.

Advantages of this invention are illustrated by the following examples. The reactants and their proportions, and other specific ingredients are presented as being typical and should not be construed to limit the invention unduly.

*Example I*

Benzene was admixed with 4-vinyl-1-cyclohexene in a mol ratio of benzene to 4-vinyl-1-cyclohexene of 9:1, and the resulting admixture was added gradually to a stirred reactor containing a boronfluoride-hydrofluoric acid-water catalyst and sufficient benzene to provide a total resulting reaction admixture initially containing benzene in a mol ratio to 4-vinyl-1-cyclohexene of 10:1. The boron fluoride-hydrofluoric acid catalyst was prepared by saturating aqueous 47 per cent hydrofluoric acid with boron fluoride at a temperature of from 70–75° F. The amount of catalyst comprised 5.0 volume per cent of the total reaction mixture. The reaction was maintained at atmospheric pressure at a temperature varied in the range of from 54 to 82° F. for 115 minutes. At the conclusion of the reaction, stirring was terminated and the reaction mixture was allowed to cool and settle. The reaction mixture settled into a benzene-rich layer, a heavy oil layer, and a liquid catalyst layer.

The three layers were separated. The benzene layer after being washed with water, was fractionated to provide a light fraction containing octahydrophenanthrene, and a heavier fraction.

The light fraction was refractionated to give a closer cut of the octahydrophenanthrene product. Properties of these fractions were as follows:

| | B. P. (°F.) (Atmos.) | Sp. Gr., 60/60 °F. | Ref. Ind. $n_D^{20}$ | Bromine No. |
|---|---|---|---|---|
| Light Fraction (A) | 482–685 | 0.9881 | 1.5593 | 0.2 |
| Heavy Fraction | 708–764 | 1.0160 | 1.5560 | 0.3 |
| Redistilled (A) (octahydrophenanthrene) | 516–555 | 0.9861 | 1.5367 | 0.2 |

The yield of 1,2,3,4,4a,9,10,10a-octahydrophenanthrene, assuming the redistilled material which comprised 80 per cent of the original light fraction to be pure octahydrophenanthrene, was 0.356 grams per gram of 1-vinyl-3-cyclohexene or 0.672 grams per gram of benzene consumed. Other reaction products comprised some lower but mostly higher boiling materials.

A 20 gram sample of the octahydrophenanthrene was boiled with 40 grams of selenium for 24 hours and with an additional 20 grams of selenium for another 21 hour period. The boiling point of the reaction mixture rose during the reaction period from about 550 to 650° F. The hydrocarbon liquid reaction product was separated from the glassy solid selenium, filtered and fractionated at a pressure of 2 mm. of Hg. The last 25 per cent of the still charge was a crystalline solid which, after one crystallization from methanol, melted at 100° C. (uncorrected). The melting point of phenanthrene is reported as 100° C. (Huntress-Mulikan, "Identification of Pure Organic Compounds, Order I," page 512). A mixed melting point of the presumed phenanthrene with an equal amount of a known sample of phenanthrene was determined as 97.5–98.5° C. (uncorrected). A picrate was prepared from the presumed phenanthrene which melted at 143–144° C. The picrate of phenanthrene is reported to melt at 143° C. A mixed melting point of the picrate of the presumed phenanthrene with a known sample of phenanthrene picrate melted at 144° C.

*Example II*

Cumene was admixed with 4-vinyl-1-cyclohexene in a mol ratio of cumene to 4-vinyl-1-cyclohexene of 9 to 1, and the resulting admixture was introduced gradually into a stirred reactor containing a boron fluoride-water-hydrofluoric acid catalyst and sufficient cumene to provide a total reaction mixture initially containing cumene in a mol ratio to 4-vinyl-1-cyclohexene of 10 to 1. The boron fluoride-hydrofluoric acid-water catalyst was prepared by saturating aqueous 47 per cent hydrofluoric acid with boron fluoride at a temperature of 70–75° F. The mol ratio of water to boron fluoride in the catalyst was 1 to 1. The amount of catalyst in the reactor comprised 5 volume per cent of the total reaction mixture. The resulting catalyst-cumene -4- vinyl-1-cyclohexene admixture was maintained at atmospheric pressure at a temperature varied in the range of from 60–64° F. for 66 minutes, under which conditions cumene reacted with 4-vinyl-1-cyclohexene to form isopropyl octahydrophenanthrene.

At the conclusion of the reaction, stirring was terminated and the reaction mixture was allowed to settle. The reaction mixture settled to form a cumene-rich layer, a heavy oil layer, and a liquid catalyst layer. The three layers were separated, and the cumene phase after being washed with water was fractionated into a light fraction rich in isopropyl phenanthrene, and a heavy fraction. Properties of these fractions were as follows:

| | Boiling Range, °F. (Atmospheric Pressure) | Sp. Gr., 60/60 | Ref. Ind. $n_D^{20}$ |
|---|---|---|---|
| Light Fraction | 556–622 | 0.9665 | 1.5324 |
| Heavy Fraction | 761–807 | 0.9944 | 1.5464 |

The yield of the isopropyl octahydrophenanthrene-rich fraction was 1.088 grams per gram of reacted 4-vinyl-1-cyclohexene, and 1.225 grams per gram of reacted cumene.

*Example III*

Benzene was admixed with 4-vinyl-1-cyclohexene in a mole ratio of benzene to 4-vinyl-1-cyclohexene of 9 to 1, and the resulting admixture was introduced gradually into a stirred reactor containing a boron fluoride-water complex as a catalyst, and sufficient benzene to provide a total reaction mixture initially containing benzene in a mol ratio to 4-vinyl-1-cyclohexene of 10 to 1. The complex catalyst was prepared by saturating water with boron fluoride, at a temperature of from 70–75° F. and contained boron fluoride in a mol ratio to water, of 1:1. The amount of catalyst in the resulting reaction mixture comprised 5.0 volume per cent of the total reaction mixture. The reaction mixture was maintained at atmospheric pressure and at a temperature within the limits of 60–73° F., for 104 minutes. At the conclusion of the reaction, stirring was terminated and the reaction mixture was allowed to settle. The reaction mixture settled to form a benzene-rich layer, a heavy oil layer and a catalyst layer. The three layers were separated, and the benzene-rich layer after being washed with water, was fractionated to provide a light product fraction rich in octahydrophenanthrene, and a heavy product fraction. Properties of these fractions were as follows:

| | Boiling Range, °F. (Atmospheric Pressure) | Sp. Gr., 60/60 | Ref. Ind. $n_D^{20}$ |
|---|---|---|---|
| Light Fraction | 492–554 | 0.9944 | 1.5430 |
| Heavy Fraction | 574–788 | 1.0086 | 1.5463 |

The yield of the octahydrophenanthrene-rich fraction, was 0.339 grams per gram of reacted 4-vinyl-1-cyclohexene, and 0.702 grams per gram of reacted benzene.

*Example IV*

Benzene was admixed with 4-vinyl-1-cyclohexene to provide a resulting admixture containing benzene in a mol ratio to 4-vinyl-1-cylohexene of 10 to 1, and the resulting admixture was passed through a bed of granular montmorillonite, at a temperature of 300 to 326° F. under a nitrogen pressure of 350 p. s. i. g., and at a space velocity of 0.5 liquid volumes of benzene-4-vinyl-1-cyclohexene feed admixture per volume of catalyst per hour. The montmorillonite catalyst was an acid treated montmorillonite referred to in the specification as a magnesium substituted hydrogen montmorillonite, and known commercially as Super Filtrol. Effluent from the catalyst zone was allowed to settle, and formed a benzene-rich layer, a heavy oil product layer and a catalyst layer. The three layers were separated, and the benzene-rich layer, after being washed with water, was fractionated to provide a light product fraction, rich in octahydrophenanthrene and a heavy product fraction. Properties of these fractions were as follows:

| | Boiling Range, °F. (Atmospheric Pressure) | Sp. Gr., 60/60 | Ref. Ind. $n_D^{25}$ |
|---|---|---|---|
| Light Fraction | 506–594 | 0.9580 | 1.5236 |
| Heavy Fraction | 669–750 | 1.007 | 1.5464 |

The octahydrophenanthrene-rich fraction was recovered in a yield of 0.684 gram per gram of reacted 4-vinyl-1-cyclohexene, and of 3.410 grams per gram of reacted benzene.

As will be evident to those skilled in the art various modifications can be made or followed in the light of the foregoing disclosure and discussion without departing from the spirit of scope of the disclosure or the scope of the claims.

I claim:

1. A process for the manufacture of an octahydrophenanthrene, comprising inter-reacting 4-vinyl-1-cyclohexene with an aromatic reactant compound having the composition illustrated by a structural formula selected from the group consisting of

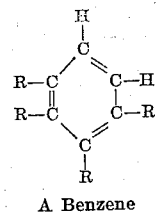

A Benzene

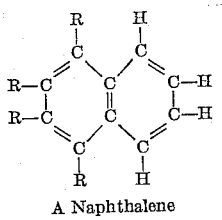

A Naphthalene wherein in each said structural formula, R is a radical selected from the group consisting of hydrogen, methyl, ethyl, n-propyl, i-propyl, n-butyl, i-butyl, tert.-butyl, hydroxy, methoxy, ethoxy, propoxy, butoxy, chlorine, bromine, iodine, fluorine, at least two R's are hydrogen, and the total R's contain not more than eight carbon atoms; and in the structural formula representing the said benzene reactant, one R can be a phenyl radical, and effecting the inter-reaction under catalytic alkylation conditions for alkylating an aromatic hydrocarbon with an aliphatic olefin.

2. The process of claim 1 wherein said inter-reacting is conducted at a temperature within the limits of 40 to 650° F., a pressure within the limits of atmospheric to 1000 p. s. i. g., a reaction time within the limits of 12 to 600 minutes, and wherein said aromatic reactant and said 4-vinyl-1-cyclohexene are introduced into reaction in an aromatic reactant to 4-vinyl-1-cyclohexene mol ratio within the limits of 2:1 to 15:1.

3. The process of claim 2 wherein said inter-reacting is conducted in the presence of a liquid type alkylation catalyst, said temperature is within the limits of 40 to 150° F., said pressure is within the limits of 10 to 50 p. s. i. g., said time is within the limits of 30 to 200 minutes, and the proportion of catalyst in the zone of said inter-reacting is within the limits of 1 to 50 per cent based on the volume of the total reaction mixture.

4. A process for the production of partially hydrogenated polycyclic organic compound, which comprises reacting 4-vinyl-1-cyclohexene with a carbocyclic aromatic compound having on each of two adjacent nuclear carbon atoms a replaceable hydrogen atom and having not more than two carbocyclic rings, under catalytic alkylation conditions for alkylating an aromatic hydrocarbon with an aliphatic olefin.

5. A process for producing 1, 2, 3, 4, 4a, 9, 10, 10a-octahydrophenanthrene which comprises reacting benzene with 4-vinyl-1-cyclohexene under catalytic alkylation conditions for alkylating an aromatic hydrocarbon with an aliphatic olefin.

6. A process for producing 1, 2, 3, 4, 4a, 11, 12, 12a-octahydrochrysene which comprises reacting naphthalene with 4-vinyl-1-hexene under catalytic alkylation conditions for alkylating an aromatic hydrocarbon with an aliphatic olefin.

7. A process for the manufacture of an octahydrophenanthrene comprising introducing 4-vinyl-1-cyclohexene and an alkyl substituted benzene containing not more than two alkyl substituents, having not more than 14 carbon atoms in the molecule and containing two adjacent carbon atoms in the ring each bonded to an unsubstituted hydrogen, in an alkyl benzene to 4-vinyl-1-cyclohexene mol ratio within the limits of 2:1 to 15:1, in contact with from 1 to 50 per cent of a liquid alkylation catalyst comprising a boron-fluoride complex based on the volume of the total resulting admixture, at a temperature within the limits of 40 to 150° F., a pressure within the limits of 10 to 50 p. s. i. g. and for a contact time within the limits of 30 to 200 minutes, and recovering an octahydrophenanthrene from the resulting reaction mixture.

8. A process for the manufacture of an octahydrophenanthrene comprising introducing 4-vinyl-1-cyclohexene and an alkyl substituted benzene containing not more than two alkyl substituents, having not more than 14 carbon atoms in the molecule and containing two adjacent carbon atoms in the ring each bonded to an unsubstituted hydrogen, in an alkyl benzene to 4-vinyl-1-cyclohexene mol ratio within the limits of 2:1 to 15:1, in contact with from 1 to 50 per cent of a catalyst comprising hydrofluoric acid based on the volume of the total resulting mixture, at a temperature within the limits of 40 to 150° F., a pressure within the limits of 10 to 50 p. s. i. g. and for a contact time within the limits of 30 to 200 minutes, and recovering an octahydrophenanthrene from the resulting reaction mixture.

9. A process for the manufacture of an octahydrophenanthrene comprising introducing 4-vinyl-1-cyclohexene and an alkyl substituted benzene containing not more than two alkyl substituents, having not more than 14 carbon atoms in the molecule, and containing two adjacent carbon atoms in the ring each bonded to unsubstituted hydrogen, in an alkyl benzene to 4-vinyl-1-cyclohexene mol ratio within the limits of 2:1 to 15:1 into reaction in the presence of an activated montmorillonite as a catalyst, at a temperature within the limits of 150 to 650° F., a pressure within the limits of 100 to 1000 p. s. i. g. and for a contact time within the limits of 12 to 600 minutes, and recovering an octahydrophenanthrene from the resulting reaction mixture as a product of the process.

10. A process for the manufacture of 1, 2, 3, 4, 4a, 9, 10, 10a-octahydrophenanthrene comprising catalytically inter-reacting benzene and 4-vinyl-1-cyclohexene introduced in a benzene to 4-vinyl-1-cyclohexene mol ratio within the limits of from 5:1 to 10:1 into contact with a liquid hydrofluoric acid-boron fluoride-water complex as a catalyst, at a temperature within the limits of 50–120° F., a reaction time within the limits of 50–150 minutes and a pressure within the limits of from atmospheric to 50 p. s. i. g.; said catalyst comprising from 5–20 per cent by volume of the total resulting inter-reaction mixture, and containing boron fluoride in a mol ratio to water of 1:1 and from 10 to 90 weight per cent of hydrofluoric acid; and recovering 1, 2, 3, 4, 4a, 9, 10, 10a-octahydrophenanthrene from the resulting inter-reaction admixture as a product of the process.

11. A process for the manufacture of 1, 2, 3, 4, 4a, 9, 10, 10a-octahydrophenanthrene comprising catalytically inter-reacting benzene and 4-vinyl-1-cyclohexene introduced in a benzene to 4-vinyl-1-cyclohexene mol ratio within the limits of from 5:1 to 10:1 into contact with a liquid boron fluoride-water complex as a catalyst, at a temperature within the limits of 50–120° F., a reaction time within the limits of 50–150 minutes and a pressure within the limits of from atmospheric to 50 p. s. i. g.; said catalyst comprising from 5–20 per cent by volume of the total resulting inter-reaction mixture and comprising water saturated with boron fluoride; and recovering 1, 2, 3, 4, 4a, 9, 10, 10a-octahydrophenanthrene from the resulting inter-reaction admixture as a product of the process.

12. A process for the manufacture of isopropyl octahydrophenanthrene comprising catalytically inter-reacting cumene and 4-vinyl-1-cyclohexene introduced in a cumene to 4-vinyl-1-cyclohexene mol ratio within the limits of from 5:1 to 10:1 into contact with a liquid hydrofluoric acid-boron fluoride-water complex as a catalyst, at a temperature within the limits of 50–120° F., a reaction time within the limits of 50–150 minutes and a pressure within the limits of from atmospheric to 50 p. s. i. g.; said catalyst comprising from 5–20 per cent by volume of the total resulting inter-reaction mixture, and containing boron fluoride in a mol ratio to water of 1:1 and from 10 to 90 weight per cent of hydrofluoric acid; and recovering isopropyl octahydrophenanthrene as a product of the process.

13. A process for the manufacture of 1, 2, 3, 4, 4a, 9, 10, 10a-octahydrophenanthrene comprising passing benzene and 4-vinyl-1-cyclohexene in a mol ratio of benzene to 4-vinyl-1-cyclohexene within the limits of 5:1 to 10:1 through a fixed bed of a magnesium substituted hydrogen montmorillonite, at a temperature within the limits of 200 to 500° F., a pressure of from 100 to 1000 p. s. i. g., and at a space velocity of from 0.5 to 2.0 volumes total reactants per volume of said montmorillonite per hour, and recovering 1, 2, 3, 4, 4a, 9, 10, 10a-octahydrophenanthrene from effluents of the resulting inter-reaction, as a product of the process.

FREDRICK M. SMITH.

REFERENCES CITED

The following references are of record in the file of this patent:

UNITED STATES PATENTS

| Number | Name | Date |
|---|---|---|
| 2,386,507 | Quin | Oct. 9, 1945 |

OTHER REFERENCES

Cook et al.: "The Synthesis of Compounds Related to the Sterols, Bile Acids, and Oestrus-producing Hormones." J. Chem. Soc. (London) 1933 pages 1098–1112.